United States Patent
Matthias et al.

(10) Patent No.: US 11,898,473 B2
(45) Date of Patent: Feb. 13, 2024

(54) METHOD AND DEVICE FOR MANUFACTURING HOLLOW, INTERNALLY COOLED VALVES

(71) Applicant: FEDERAL-MOGUL VALVETRAIN GMBH, Barsinghausen (DE)

(72) Inventors: Thorsten Matthias, Garbsen (DE); Dirk Schober, Uetze (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 0 days.

(21) Appl. No.: 17/772,214

(22) PCT Filed: Jul. 22, 2020

(86) PCT No.: PCT/EP2020/070669
§ 371 (c)(1),
(2) Date: Apr. 27, 2022

(87) PCT Pub. No.: WO2021/104688
PCT Pub. Date: Jun. 3, 2021

(65) Prior Publication Data
US 2022/0403761 A1    Dec. 22, 2022

(30) Foreign Application Priority Data
Nov. 27, 2019    (DE) .......................... 102019132085.2

(51) Int. Cl.
*B21J 5/12*    (2006.01)
*B21K 1/22*    (2006.01)
(Continued)

(52) U.S. Cl.
CPC . *F01L 3/14* (2013.01); *B21J 5/12* (2013.01); *B21K 1/22* (2013.01); *B23P 15/002* (2013.01); *F01L 2303/01* (2020.05)

(58) Field of Classification Search
CPC . F01L 3/14; F01L 2303/01; B21J 5/12; B21K 1/22; B23P 15/002
See application file for complete search history.

(56) References Cited

U.S. PATENT DOCUMENTS 2,411,734 A * 11/1946 Kerwin .................... B21K 1/22
29/888.45
4,733,698 A    3/1988 Sato
(Continued)

FOREIGN PATENT DOCUMENTS

DE    102016014769 A1    6/2018
DE    102017114509 A1    1/2019
(Continued)

*Primary Examiner* — Lawrence Averick
(74) *Attorney, Agent, or Firm* — Robert L. Stearns; Dickinson Wright PLLC

(57) ABSTRACT

A method for shaping a hollow valve preform of a pull rod (20) includes a structuring bulb (22) which is inserted into the cavity (56) of a shaft portion (44) of a valve preform. The structuring bulb (22) has an outer diameter, and has an outer structuring, whereafter the hollow shaft portion (44) is shaped, wherein at least a portion of an inner diameter of the cavity (56) is reduced below an outer diameter of the structuring bulb (22). The structuring bulb (22) is then pulled out through the shaped shaft portion (44), wherein the outer structuring is at least partially pressed into the surface of the cavity (56).

12 Claims, 6 Drawing Sheets

(51) Int. Cl.
    *B23P 15/00*     (2006.01)
    *F01L 3/14*      (2006.01)

(56) References Cited

U.S. PATENT DOCUMENTS

2014/0033533 A1* 2/2014 Morii ..................... B21K 1/22
                                                    29/890.12
2018/0298793 A1* 10/2018 Karita ................... H05B 6/101
2021/0053105 A1*  2/2021 Matthias ................ B21K 1/22

FOREIGN PATENT DOCUMENTS

DE    102018100413 B3    7/2019
JP    201408084725 A     5/2014

* cited by examiner

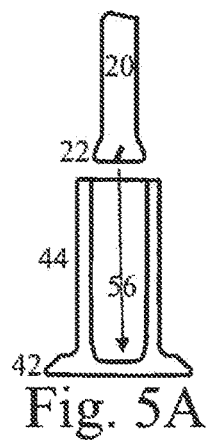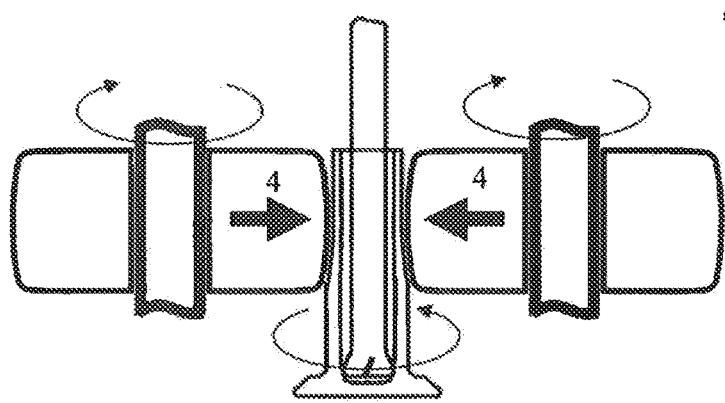
Fig. 5A  Fig. 5B  Fig. 5C
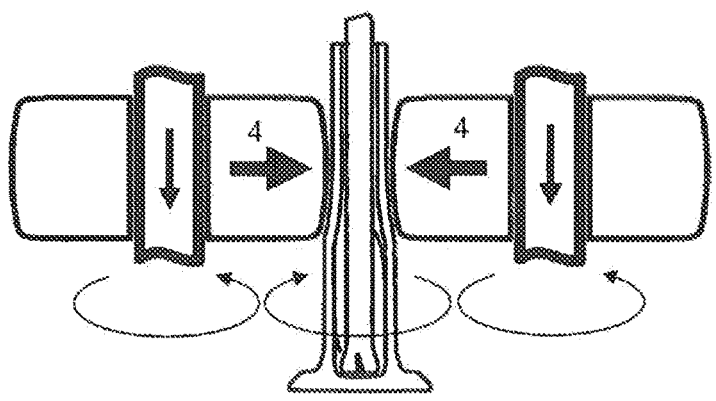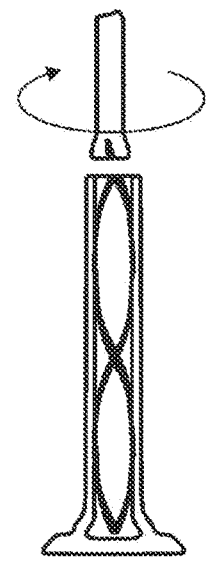
Fig. 5D  Fig. 5E
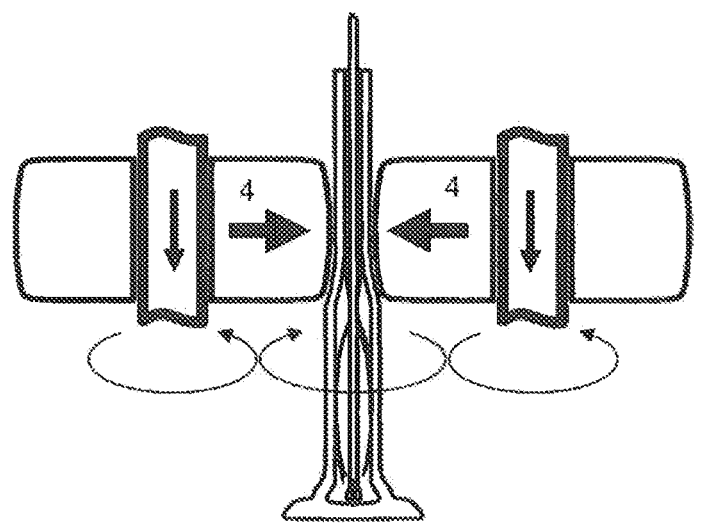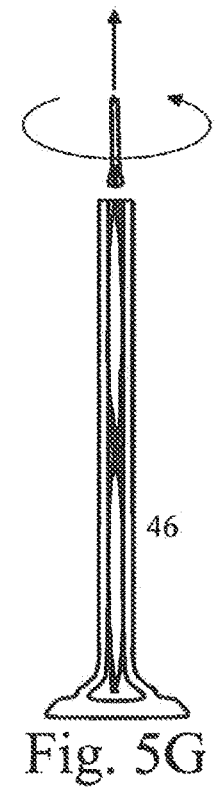
Fig. 5F  Fig. 5G

METHOD AND DEVICE FOR MANUFACTURING HOLLOW, INTERNALLY COOLED VALVES

BACKGROUND

1. Technical Field

The present invention relates to a method and a device for producing hollow, internally cooled valves as well as a valve produced thereby. The invention relates in particular to the production of valve blanks from valve preforms.

2. Related Art

Valve blanks generally have the form of a finished valve, in particular of a plate valve of an internal combustion engine. Valve blanks can also require finishing steps, such as filling with a coolant, e.g. sodium, as well as a closing, or a surface finishing.

SUMMARY

The present invention thereby uses a tapering of the cross section of at least the shaft portion, in order to form a relatively long valve shaft with a relatively small diameter compared to a later valve plate portion from a relatively short tube fitting, with a large diameter. Here and hereinafter, the term "tapering" will be used for a shaping method, in the case of which a diameter of a hollow shaft is reduced and a length of the shaft is simultaneously increased in an axial direction. For example, each manufacturing method for reducing cross sections of massive or hollow workpieces is considered to be tapering here. The tapering can be performed as "necking" here by means of a matrix. The tapering can likewise be performed as transverse rolling, namely as transverse round rolling or transverse wedge rolling. The tapering can likewise be performed as section longitudinal rolling, for example in the back-step welding method. The tapering can likewise be carried out by means of hammering or rotary swaging. The tapering can likewise refer to an extrusion, which, in turn, belongs to the pressure shaping. Only a portion of a valve preform is tapered here. Here and hereinafter, the expression "tapering" will be used in terms of a shaping of a tube fitting of a valve preform.

Based on the various methods, which can be referred to as tapering, they will no longer be discussed explicitly hereinafter.

The present invention relates to a method for producing valves or valve blanks, respectively, to a corresponding device, as well as a valve, which is produced by means of this method.

One option for providing a shaft of a hollow valve with a structure on the inside, is already known and is used in particular in the case of multi-piece valves. To date, mainly broaches were used thereby in order to cut an even structure into a hollow shaft. However, broaches cannot be used in the case of one-piece valves because a broach is usually pulled completely through a workpiece. This is not possible in the case of valves, which are integral.

Internally cooled valves, in the case of which the valve plate and the shaft are made of a bowl-shaped preform by means of shaping, are known to date.

It is thus desirable to have an internally cooled valve, which is embodied integrally and which has a structuring in the cavity and in particular in the shaft.

According to another aspect of the present invention, a method for shaping a hollow valve preform is provided. The method comprises a provision of a valve preform, which comprises a head portion and a hollow shaft portion comprising a cavity. The shaft portion comprises an initial outer diameter and an inner diameter. In the method, a structuring bulb on a pull rod is furthermore inserted into the cavity. The structuring bulb has an outer diameter and is provided with an outer structuring. In a next step, the hollow shaft portion is shaped, wherein at least a portion of an inner diameter of the cavity is reduced below the outer diameter of the structuring bulb. After the shaping of the shaft portion, the structuring bulb is pulled out through the shaped shaft portion. The outer structuring is at least partially pressed into the surface of the cavity during the pull-out.

By means of the shaping, the hollow shaft portion is lengthened and the inner diameter is reduced in a region, in which the structuring bulb is not located. By means of the shaping, at least a portion of an inner diameter of the cavity is reduced below the outer diameter of the structuring bulb. The calibrating bulb is thus caught in the cavity by means of a positive connection. The structuring bulb is then pulled out of the shaft in the axial direction, and the shaft is thereby shaped, in turn, on the inside, wherein the outer structure leaves a mark on the inside of the calibrating bulb as negative.

The outer structuring extends in the circumferential direction around the structuring bulb, so that a variation in the radius is present in the shaft in the circumferential direction after the structuring bulb is pulled through the shaft. The molded structure of the structuring bulb creates structures, which extend in the axial direction or in a helix direction. The outer diameter RA of the structured structuring bulb will be referred to as groove dimension hereinafter. The smallest diameter (or twice the smallest radius, respectively) of the structured structuring bulb will be referred to as land dimension hereinafter. After the pull-through, the structure is present in the structured structuring bulb having left a mark or in a molded manner, respectively, on the inside of the hollow shaft. The terms groove dimension and land dimensions will be used analogously to the manufacture of gun barrels hereinafter, wherein the groove dimension is always larger than the land dimension. These two dimensions in each case always refer to twice the groove dimension radius or land dimension radius, respectively, and not mandatorily to a diameter of the structured structuring bulb. According to the invention, the structuring of the cavity represents a pressure shaping. The terms groove dimension and land dimension are equated for the cavity and the structuring bulb after the structured structuring bulb is pulled through, wherein a portion of an elastic deformation is neglected.

When shaping the shaft portion, the inner diameter of the shaft portion is reduced below the groove dimension of the structured structuring bulb. If the structured structuring bulb is now pulled out of the cavity, at least the inner diameter of the shaft portion is widened to the groove dimension. When pulling out the structuring bulb, material is displaced from the region of the grooves to a region of the lands.

The displacement mainly takes place in the circumferential direction. The pulling force is thereby limited by the cross section of the pull rod. The pulling force limits the number, shape, and radial depth of the grooves.

The pull-out can take place freely, or in a state, in which the shaft portion is supported from the outside, in order to prevent that the diameter of the shaft is increased again after the tapering shaping. Depending on the structure and depending on the structure height (which corresponds to half of the difference of groove dimension and land dimension), it can be expedient to support or not to support the shaft to the outside.

According to another embodiment of the method, the structuring bulb has a coil-shaped outer structuring. In the case of this method, a relative rotation takes place between the structuring bulb and the shaft portion during pull-out through the shaped shaft portion. The relative rotation can be realized by means of a rotatable or driven pull rod. It is likewise possible, however, to retain the pull rod and to rotate the shaped shaft portion during the pull-out.

Instead of inner structures running only in the axial direction, this embodiment also makes it possible to introduce structures into the valve shaft, which form a helix or multi helix.

In the case of a further embodiment of the method, the latter can further comprise a repetition of the steps of the introduction, shaping, and pull-out with different structuring bulbs. The structuring bulbs in each case comprise a decreasing outer diameter or a decreasing groove dimension, respectively. During each shaping, the shaft is tapered, wherein the inner diameter of the shaft is likewise reduced. In the ideal case, the structure height (corresponding to the difference between groove radius and land radius) remains identical or changes only slightly. During a second or further calibration with the structuring bulb, a smaller structuring bulb can then be used in each case because the shaft diameter and thus the inner diameter of the cavity decreases more and more. In the case of this method, it should be noted that the structure of the structuring bulb is in each case aligned with a structure, which is already present in the shaft cavity, during a further inner calibration. By means of the alignment, it can be prevented that the structuring bulb breaks away from the pull rod.

In the case of a further embodiment of the method, structuring bulbs, which are used one after the other, in each case have a rising structure height or outer structuring depth, respectively. The structure height should be increased during each pull-through of the structuring bulb. Each pass of a pull-out of the structuring bulb provides only a limited structure height because the pulling force of the pull rod is limited due to its dimensions. In the case of two consecutive processes, care should thus be taken that the structure height is increased in each case.

In the case of an additional embodiment, the method comprises structuring bulbs, which have a coil-shaped outer structuring with consecutive rising pitch. During the shaping and tapering of the valve shaft, the length thereof increases. However, the number of the windings of the helix-shaped structure pressed in from the inside does not change. An increase of the pitch of a helix-shaped structure, which is pressed in from the inside, results from this during each tapering process. In order to further deepen the structure in each case, the pitch of structured structuring bulbs, which are used one after the other, has to be increased more and more. This embodiment relates to a method, in the case of which several structured structural bulbs are pulled through the shaft one after the other, wherein a higher or deeper structure, respectively, is always used, in order to expand an existing structure more and more.

In the case of an additional embodiment of the method, structuring bulbs with right-handed and left-handed, coil-shaped outer structuring are used alternately. This embodiment uses the method and the helix-shaped structures in order to create diamond-shaped cooling fins on the inside of the cavity. It is utilized thereby that the shaft is shaped from a bowl-shaped blank or preform, wherein the shaft initially has a large inner diameter and a small length. The structuring bulb is then initially rotated about the axial direction here during the pull-pout. The structuring bulbs thereby initially have a small pitch. The second structuring bulb has an opposing pitch, which can additionally differ from the first one. Due to the fact that the first structuring bulbs are supported by short and thick pull rods, and the structure height is in each case only relatively small, the first grooves can be pressed in, for example, in a right-handed manner, and grooves are pressed in in a left-handed manner in a second pass, so that the lands form a diamond pattern. In each further step, the grooves crossing one another are deepened, and due to the fact that the grooves become increasingly deeper, they can also better and better guide the respective structuring bulb over the grooves, which are wound differently in each case. The respective second set of structuring bulbs predominantly presses here through the lands of the first and deepens the grooves only to a small extent. The method results in grooves with right-hand and left-hand twist in the shaft, which additionally also cross one another. A method of this type cannot be derived from the field of the barrels of guns because the grooves are only expedient in one direction there. The first structuring bulb presses a first set of grooves into the shaft on the inside, the second structuring bulb presses a second set of grooves into the shaft on the inside at an angle thereto, and a grid of grooves and a diamond pattern of lands forms one after the other in the shaft.

In the case of an additional embodiment of the method, the structuring bulbs are aligned to grooves or lands, respectively, which are already present, in the shaft prior to the pull-out. This can take place via respective angle sensors on the workpiece and the structuring bulb or the pull rod, respectively. It is likewise provided that the structure of the structuring bulb has guide components, such as guide bevels or cones, so that the bulb can partially align independently on the grooves, which are present. It is likewise possible to align the bulb by means of force sensors, which measure the force, with which the structuring bulb and the valve shaft are rotated against one another, while the structuring bulb is moved slowly in the axial direction. The structure of the current structuring bulb should then engage with the grooves, which are present, at some point, and should put up a higher resistance to a rotation. When the direction of rotation is then reversed, an engagement can likewise be determined from a next rise of the resistance, and the structuring bulb can be aligned exactly midway between the rises.

In the case of a further exemplary embodiment of the method, the latter comprises the use of a pulling device, wherein a pulling device control controls the pulling device so that the structuring bulb is pulled through the shaft portion with an oscillating force. It is likewise provided that the structuring bulb is pulled out of the valve shaft in several steps. The method is to prevent a stick-slip effect thereby, in that the structuring bulbs are pulled out of the shaft with changing force before an increased static friction can occur between parts of the preform and the structuring bulb. In addition, an oscillation superposition can be used in the main force flow while pulling, wherein a mechanical oscillation excitation (e.g. pneumatic vibrators or knockers, respectively, e.g. hydraulic systems) or electromagnetic systems (Zebu piezoelectric actuators, magneto-resistive exciters) are superimposed to the pulling force. An oscillation superposition can likewise be created by means of an ultrasonic oscillation. The frequencies and amplitudes are thereby strongly dependent on the selected drive. The frequency can thus be between 2 Hz-50 kHz, and the amplitude between 1 µm-2 mm.

According to a further aspect of the present invention, a valve blank or valve is provided, which was produced by means of one of the above-described methods. Such a valve thereby has shaped inner structures, which run either only in the axial direction or in one or two helix directions.

According to an exemplary embodiment of the valve, a hollow shaft of the valve is provided with grooves. The inner structure thereby runs in a helix or a coil of the hollow shaft. Due to the helical shape, a surface is increased compared to a structuring, which runs purely in the axial direction. A coil-shaped structuring is additionally less susceptible to a compressive load in the radial direction.

According to a further exemplary embodiment of the valve, the hollow shaft of the valve is provided with oppositely directed grooves. They are produced according to the above-described method and provide for a particularly good flow behavior of the coolant because gas portions in the cavity can flow past it during a movement of the coolant in the region of the grooves.

THE DRAWINGS

The present invention will be described hereinafter on the basis of schematic illustrations of exemplary embodiments.

FIGS. 5A to 5G represent a further modified method according to the invention, in the case of which an inner structuring in the form of two helixes, which cross one another, is formed, wherein rotary rolling is used as tapering method.

DETAILED DESCRIPTION

Figure 1A:
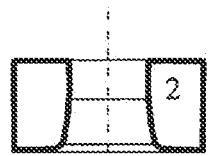
FIGS. 1A to 1H illustrate a conventional method for shaping a valve preform into a valve blank.
Figure 1B:
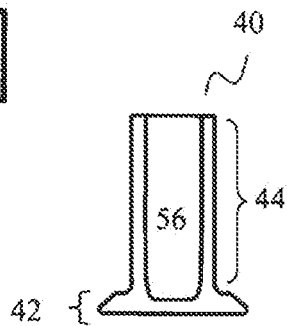

In the description as well as in the figures, identical or similar reference numerals will be used hereinafter for identical or similar elements and components.

FIG. 1A shows a multi-stage matrix 2 for tapering a shaft portion of a valve preform. The matrix 2 thereby comprises a through opening with a round cross section. The through opening thereby comprises a reduction cone portion, in which the through opening tapers from an input diameter.

In the present embodiment, the matrix essentially forms a drawing die, as it is known from the shaping method of wire drawing. In contrast to the wire drawing, however, the matrix is intended for the purpose that a shaft portion of a valve preform is pressed into the matrix from the outside or from the bottom, respectively. A completely different load situation is thus present.

FIGS. 1B to 1H represent individual steps of a method for shaping a valve preform 40 into a valve blank 46. The valve preform 40 thereby comprises a plate portion 42, which is also referred to as head portion, and a shaft portion 44, the material of which lateral forms a valve shaft. A cavity 26, which runs from one end of the shaft portion 44 in the direction of the plate portion 42, is arranged in the shaft portion. One aspect of the invention lies in that in the region of the plate portion 42, the cavity 56 has a radius, which is larger than that of a shaft of the later valve. A cavity 56, which has a larger diameter in the head of the valve than could be attained by means of a metal-cutting manufacturing, can be produced therewith in a relatively simple manner in a valve. The shaft portion 44 of the valve preform 40 thereby has an initial outer diameter, which is smaller than an input diameter of the matrix 2.

Figure 1C:
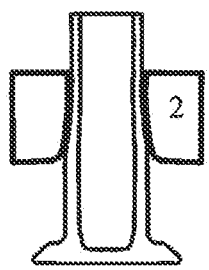

In FIG. 1C, the shaft portion 44 of the valve preform 40 has been pressed approximately halfway into the matrix 2 of the FIG. 1A. The initial outer diameter was reduced to a tapered outer diameter thereby. The tapering in each case reduced the outer diameter and the inner diameter of the shaft portion, whereas the length of the shaft portion was increased by the shaping.

Figure 1D:
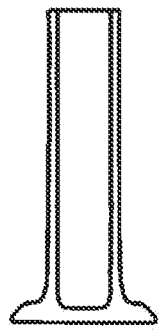

In FIG. 1D, the matrix 2 was removed again after it was moved all the way to the plate portion 42 (or the valve preform 40 was pressed into the matrix 2 all the way to the plate portion 42, respectively). The once tapered shaft portion 44 of the valve preform 40 can now be further tapered by means of a further matrix, which has a smaller inner diameter. It is possible to subject the valve preform 40 to a stress relief annealing, in order to simplify a next tapering step.

Figure 1E:
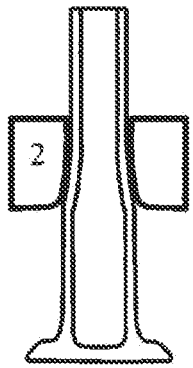

FIG. 1E corresponds to FIG. 1C, wherein only a smaller matrix, and the valve preform of FIG. 1D, which was already deformed once, is used.

Figure 1F:
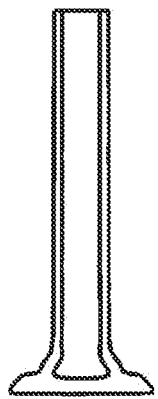

FIG. 1F corresponds to FIG. 1E, wherein the valve preform, however, was shaped in a second step.

Figure 1G:
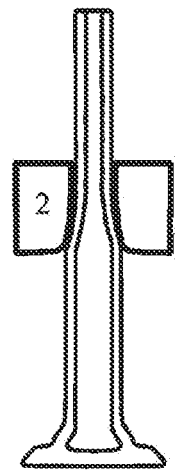
Figure 2A:
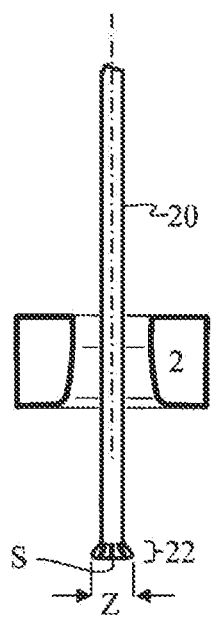
FIGS. 2A to 2F illustrate a method according to the invention for shaping a valve preform into a valve blank, wherein a structuring is attached on the inside of a valve shaft.
Figure 2B:
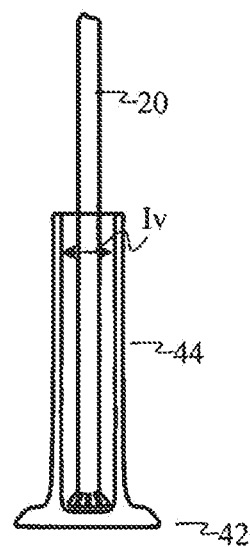
Figure 2C:
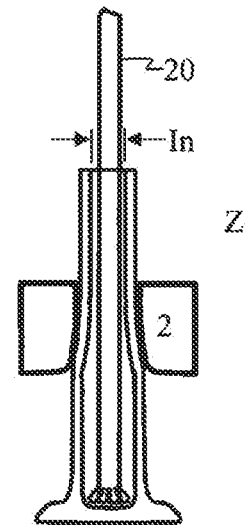
Figure 2D:
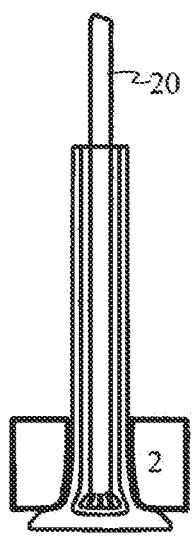
Figure 2E:
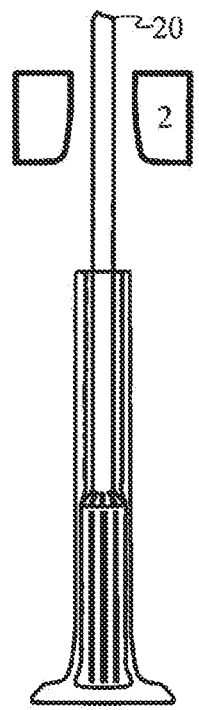
Figure 2F:
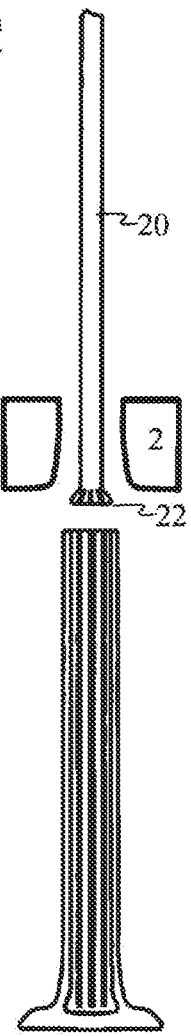

FIG. 1G corresponds to FIG. 1C or 1E, respectively, wherein only an even smaller matrix is used, and the shaft portion of the valve preform of FIG. 2F, which was already tapered twice, is further tapered.

Figure 1H:
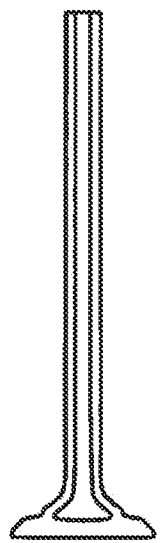

FIG. 1H shows a valve preform, which was shaped so often that it can be considered to be a valve blank 46. The cavity 56 of the valve blank 46 can now be partially filled with a coolant, such as sodium, and can be closed. It is likewise possible to machine an outer surface of the valve blank, in order to attain desired surface qualities and tolerances.

This method has the risk that the valve shaft buckles or is compressed during the press-in operation, whereby the valve blank becomes unusable. Conventionally, there is no possibility to provide the cavity 56 with a structure on the inside. Conventional methods for providing a valve blank with a structure on the inside comprise the use of multi-piece valves, wherein the valve shaft can be provided with a structure on the inside by means of a broach. However, the structure of the valve is weakened due to the multi-piece setup.

FIGS. 2A to 2F represent a possible implementation of a method, in order to provide a hollow shaft of an internally cooled valve with a structure. In addition to the matrix, the shaping tool further comprises a pull rod 20 comprising a structuring bulb 22 or a pull knob 22, respectively, on one end. The structuring bulb 22 thereby has a non-round outer shape. The structuring bulb 22 thereby at least partially forms a general cylinder comprising a non-circular jacket surface. In the large cross section, the structuring bulb 22 can form, for example, an arc polygon or a curve polygon.

FIG. 2A shows the one-step matrix 2 of FIG. 1A, wherein a pull rod 20 comprising a structuring bulb 22 on one end is further illustrated. The pull rod 20 is thereby moved essentially independently of the matrix 20 itself. During a press-in of the shaft into the matrix 2, the pull rod 20 is not moved with respect to a plate portion 42 of the valve preform 40, and does not serve the purpose of maintaining a defined gap during the press-in between the structuring bulb 22 and the reducing portion of the matrix.

In FIG. 2B, the pull rod 20 comprising the structuring bulb 22 is lowered all the way to the bottom into the cavity 56 of the valve preform 40. An outer diameter of the structuring bulb 22 is thereby smaller than an inner diameter of the cavity 56 prior to the shaping. The structuring bulb thereby corresponds to an "inside-out" drawing die, as it is known from the wire drawing. In contrast to the drawing die, not only an inner diameter is increased by means of the structuring bulb, but an initially round cross section is also shaped into a non-round cross section.

In FIGS. 2C and 2D, the shaft portion 44 of the valve preform 40 is pressed into the matrix 2, and the pull rod 20 is moved together with the valve preform 40. The structuring bulb 22 remains on the bottom of the cavity 56 during the press-in operation.

When being pressed into the matrix, the inner diameter of the shaft portion is reduced to the tapered inner diameter. The tapered inner diameter is thereby smaller than a maximum outer diameter of the structuring bulb 22.

In FIG. 2E, the pull rod 20 is pulled through the shaft portion and the cavity 56. The structuring bulb 22 thereby presses material of the shaft portion in front of it and thus increases the length of the shaft portion. The structure of the structuring bulb 22 displaces material in the circumferential direction, wherein the outer structure of the bulb 22 is pressed into the previously round cavity 56 as inner structure.

In FIG. 2F, the pull rod 20 is pulled completely out of the cavity 56. The inner structure now extends along the entire length of the shaft in the axial direction.

The structuring bulb is inserted into the cavity or the blind hole 56, respectively, wherein the inner diameter Iv is greater than or equal to the groove dimension Z of the structuring bulb 22 prior to the tapering of the blind hole or cavity 56, respectively. In a second step, the shaft 44 is tapered, so that an inner diameter In after the tapering of the shaft lies at least below the groove dimension Z of the calibrating bulb 22. It is possible to reduce the inner diameter of the shaft to or even below the land dimension F. Depending on the material properties at hand, however, it can likewise be desirable that the inner diameter of the shaft lies above the land dimension F of the structuring bulb after the tapering.

FIGS. 3A to 3G essentially correspond to FIGS. 2A to 2F. In contrast to FIG. 2A, the matrix of FIG. 3A has a long calibrating portion K, which is embodied as long straight bore. It is prevented by means of this calibrating portion K that the shaft portion 44 can give way laterally and bend when being pressed into the matrix 2. The pull rod 20 is also protected thereby Steps 3B to 3D correspond to those of FIG. 2B to 2D. In contrast to the method of FIGS. 2A to F, the matrix 2 is not pulled off the shaft portion, but, as in FIG. 3E, the pull rod 20 and thus the structuring bulb 22 is pulled through the shaft portion 44 first. The structuring bulb 22 thereby pushes material of the shaft portion 44 in front of it and thus increases the length of the shaft portion 44. The structure of the structuring bulb 22 displaces material in the circumferential direction and radial direction, wherein the outer structure of the bulb 22 is pressed into the previously round cavity 56 as inner structure. In contrast to the embodiment of FIGS. 2A to 3F, the material of the shaft portion cannot give way to the outside when the pull rod and the calibrating bulb are pulled out. This provides for a stronger structuring of the cavity 56. The length of the shaft portion can thus be further increased at the same time. The radial support of the shaft portion while pulling the calibrating bulb can further reduce a portion of elastic deformations, whereby it becomes possible to attain a stronger deformation of the surface of the cavity 56 of the valve shaft 44. This is in particular important because the wall thickness of valves is much smaller than in the case of barrels of guns, in the case of which similar shaping methods are used.

Figure 3A:
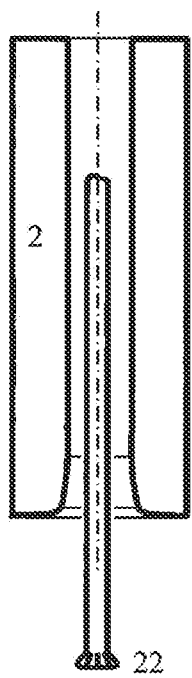
FIGS. 3 to 3G illustrate a further method of for shaping a valve preform into a valve blank.
Figure 3B:
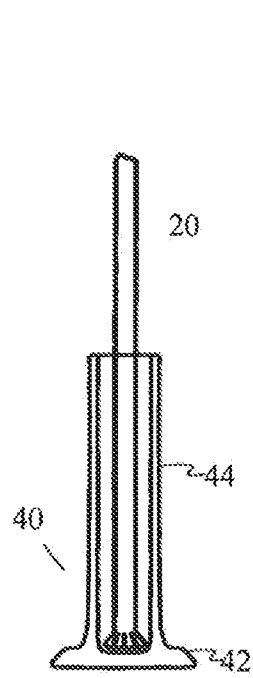
Figure 3C:
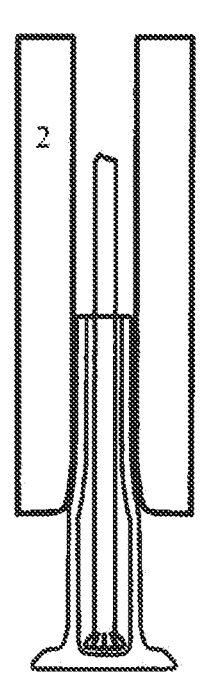
Figure 3D:
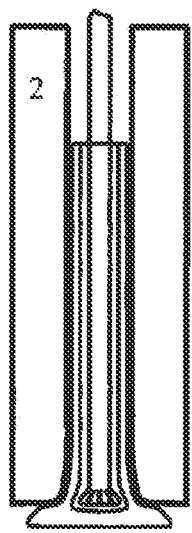
Figure 3E:
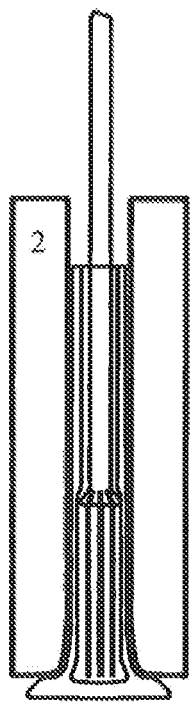
Figure 3F:
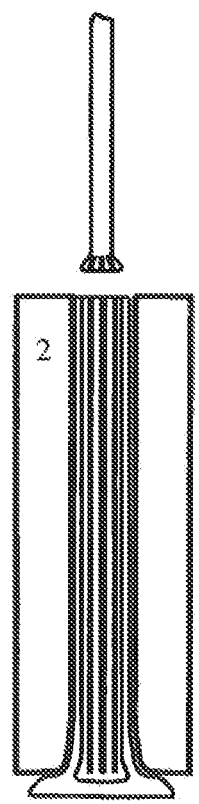
Figure 3G:
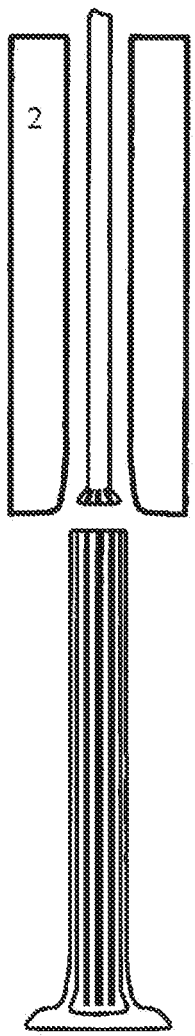

Lastly, the tapered and calibrated shaft portion 44 of the valve preform 40 is pulled out of the matrix 2 completely again in FIG. 3F. The tapered and calibrated shaft portion of the valve preform thereby has the same outer diameter A as a non-calibrated shaft portion. The tapered and calibrated shaft portion of the valve preform thereby has a larger calibrated and structured inner diameter of the groove dimension Z than the non-calibrated and non-structured shaft portion from FIG. 3D.

In FIG. 3H, the matrix 2 comprising the calibrating portion K is removed from the shaft portion.

In contrast to the method of FIG. 2, the order, in which the matrix 2 and the structuring bulb 22 are removed or pulled out, respectively, is reversed in the method of FIG. 3.

Figure 4A:
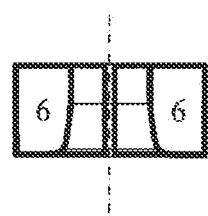
FIGS. 4A to 4H illustrate a further modified method according to the invention, in the case of which an inner structuring in the form of a helix is formed, wherein rotary swaging is used as tapering method.

FIGS. 4A to 4H clarify a further method according to the present invention. FIG. 4A represents pressure pieces or hammers 6, respectively, or hammer heads for a peening or rotary swaging method as means for tapering the shaft portion 44. In contrast to the method of FIG. 2, the shaft portion 44 is not tapered by means of a matrix here but by means of hammers or dies or pressure pieces 6, respectively. The main difference to FIG. 2 thereby lies in the direction of movement of the tapering tool or tools, respectively.

A forming tool comprising pressure pieces or hammers 6, respectively, is illustrated in a cross section in FIG. 4A. The pressure pieces, hammers, or swaging jaws 6 thereby in each case cover an angle of between 90° and 120°, and are simultaneously or alternately pressed or struck against the shaft from the outside. The valve shaft 44 is thereby rotated about its axis of symmetry, in order to obtain a tapered shape, which is as evenly round as possible.

Figure 4B:
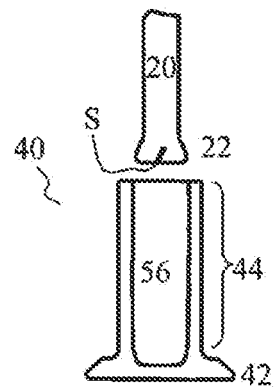

Prior to the tapering, the pull rod 20 is inserted into the cavity 56 here in FIG. 4B.

In contrast to the pull rod 20 and the structuring bulb 22 of the previous figures, the structure of the structuring bulb does not form a general cylinder but a general helix. This is suggested by means of the oblique structure. For the sake of clarity, only two grooves are placed in FIG. 4.

Figure 4C:
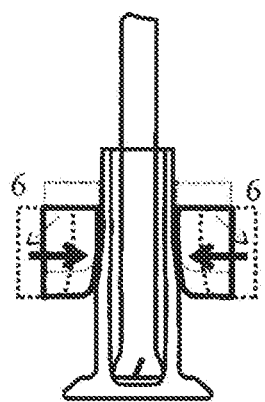

In FIG. 4C, the shaft portion is tapered by means of rotary swaging, wherein the length of the shaft portion increases. As before, an inner diameter of the cavity 56 is reduced below the groove dimension Z of the structuring bulb 22 thereby.

Figure 4D:
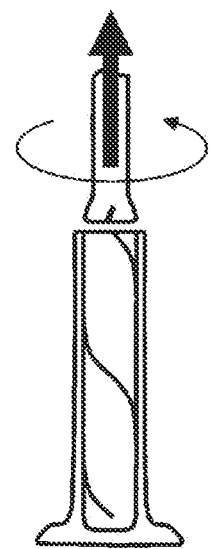

In FIG. 4D, the pull rod 20 comprising the structuring bulb 22 is pulled out of the shaft portion 44. A groove in the form of a helix is thereby pressed into an inner jacket surface of the cavity 56.

Figure 4E:
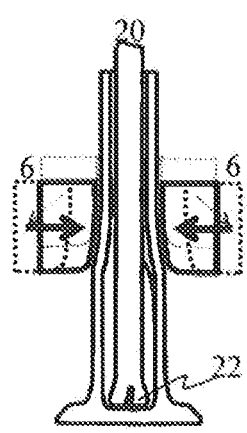

In FIG. 4E, a further second pull rod 20 with a smaller diameter and a further smaller structuring bulb 22 is inserted into the cavity 56 here. It likewise forms a generally helical structure only with a smaller diameter (groove dimension) and a larger pitch.

In FIG. 4E, the shaft portion 44, in turn, is tapered by means of rotary swaging, wherein the length of the shaft portion 44 further increases. By means of the further increase, the pitch of the groove, which has already been molded in, also rises. The inner diameters of the cavity 56 also lies below the groove dimension Z of the second structuring bulb 22 here after the tapering.

Figure 4F:
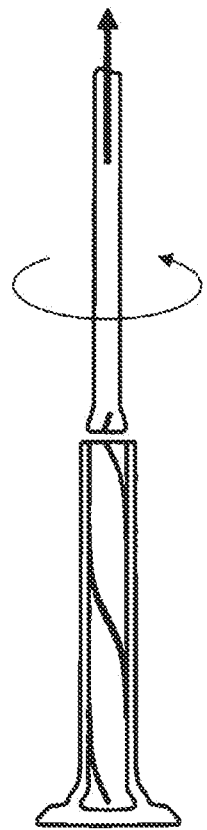

In FIG. 4F, the pull rod 20 comprising the second structuring bulb 22 is pulled out of the shaft portion 44. The groove in the form of a helix is thereby further deepened in the inner jacket surface of the cavity 56.

Figure 4G:
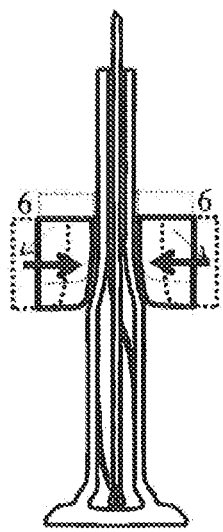
Figure 4H:
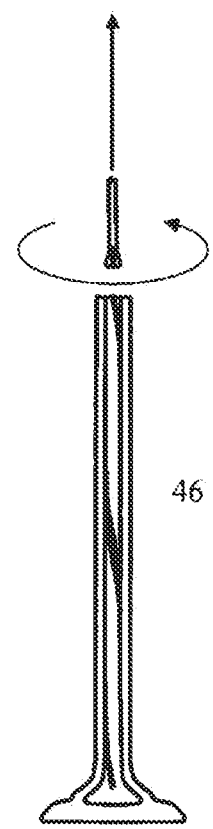

FIGS. 4G and 4H repeat steps 4E and 4F one more time, whereby the shaft portion 44 is further lengthened, the groove gains pitch and depth.

The pulling force is thereby limited by the length, the diameter, and the material properties of the respective pull rod 20. The forces for pressing the grooves into the surface of the cavity 56, in contrast, are dependent on the material properties of the shaft portion, the height of the structure, the width of the part of the structure in the circumferential direction, which effects a shaping, and the circumference of the shaping, which is specified by the structure. The shape and the surface properties as well as a lubrication, which may be present, and the friction between the structuring bulb and the material of the shaft portion can further also be crucial for the necessary shaping force.

The shaping force, however, is generally lower, the smaller the level of shaping during the pull-through of the structuring bulb 22.

FIGS. 4A to 4H clarify a multi-stage method for structuring a cavity 56 in a valve shaft. Due to the fact that the degree of the shaping during the pull-through of the structuring bulb 22 is limited, larger or higher structures, respectively, can only be created by means of several pulling processes. The principles shown in FIGS. 4A to H can also be expanded to multi-step methods.

FIGS. 5A to 5G clarify a further method according to the present invention. In contrast to the methods, which have already been introduced, the shaft portion 44 is tapered here by means of transverse rolling by means of rolling rollers 4. A cross wedge rolling can likewise be used.

In FIG. 5A, the pull rod 20 comprising the structuring bulb 22 is inserted into the cavity 56 prior to the tapering. As in FIG. 4B, the structure of the structuring bulb 22 forms a general helix. For the sake of clarity, only two individual grooves are also illustrated here.

In FIG. 5B, the shaft portion is tapered by means of round transverse rolling, wherein the length of the shaft portion 44 also increases here. As before, an inner diameter of the cavity 56 is reduced below the groove dimension Z of the structuring bulb 22.

In FIG. 5C, the pull rod comprising the structuring bulb 22 is pulled out of the shaft portion 44, wherein it is rotated about its own axis. Two grooves in the form of a helix each are thereby pressed into an inner jacket surface of the cavity 56.

In FIG. 5D, a second pull rod 20 with a smaller diameter and a smaller structuring bulb 22 is inserted into the cavity 56 here. It likewise forms a generally helical structure, wherein this helix has a different direction. As in FIG. 4E, the second structuring bulb 22 has a smaller diameter (groove dimension) and a larger pitch. In FIG. 5D, the shaft portion, in turn, is tapered by means of round transverse rolling, wherein the length of the shaft portion further increases. Due to the further increase, the pitch of the groove, which has already been molded in, also rises. As before, the inner diameter In of the cavity 56 lies below the groove dimension of the second structuring bulb after the tapering.

In FIG. 5E, the second pull rod 20 comprising the second structuring bulb 22 was pulled out of the shaft portion 44, wherein it was rotated in the opposite direction. Two further grooves in each case in the form of an oppositely directly helix are thereby pressed into the inner jacket surface of the cavity 56.

FIGS. 5F and 5G repeat steps 5D and 5E once more time, but in the original helix direction, whereby the shaft portion 44 is further lengthened, the grooves gain pitch, and the first grooves are further deepened.

The embodiment of FIG. 5 makes it possible in a relatively simple manner to produce an inner structuring, which has a large surface, and which provides for undercuts due to its structure. In particular in the case of relatively narrow grooves and broad lands, left and right grooves can alternately be pressed into the surface. In each second pass, mainly the lands of the previous pass are provided with grooves thereby. By means of a differing number of grooves for the right-handed grooves and the left-handed grooves, it is possible here to prevent that the structuring bulb of the one winding direction is caught in the respective other one. It is advisable, for example, to use 3 grooves for the first winding direction, and to use 4 grooves for the second winding direction, so that a majority of the structure can always not be deflected by means of a respective groove of a different orientation.

Figure 6:
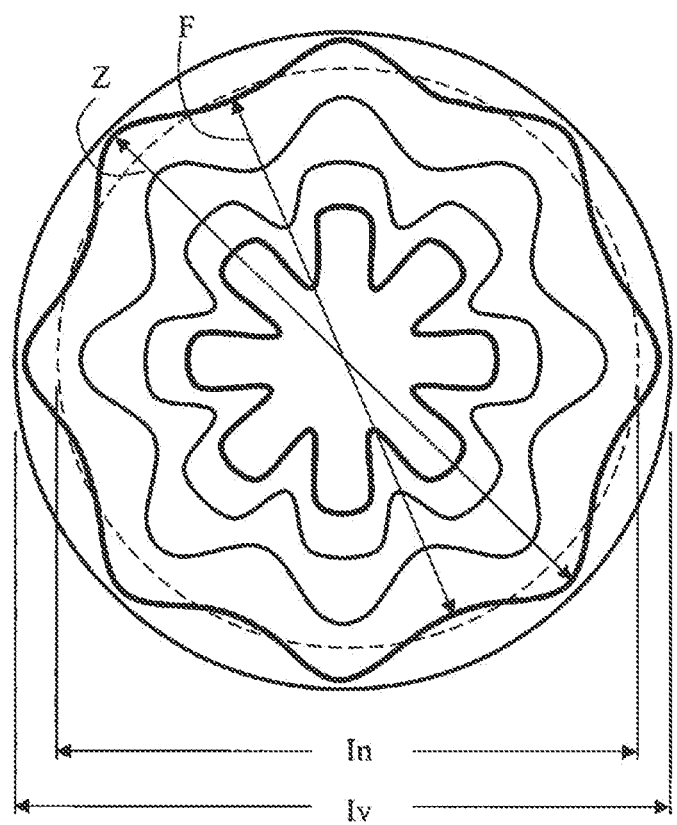
FIG. 6 shows a series of cross sections of structuring bulbs after each tapering process.

FIG. 6 shows an example of a view in the axial direction for different structuring bulbs 22.

The outer circle is to represent the inner diameter Iv of a shaft portion prior to a tapering. The first curve-polyhedral structure is to thereby represent a cross section through a structuring bulb 22. The groove dimension Z of the first structuring bulb 22 is smaller than the inner diameter Iv of the shaft portion prior to the first tapering. The second, smaller circle clarifies the inner diameter In of the shaft portion after the first tapering. It is larger here than the land dimension F of the first structuring bulb. After a pull-through of the structuring bulb 22, the cavity 56 has the same structure as the first structuring bulb 22. In a further tapering step, this structure is further decreased. The structure does not decrease evenly. During the tapering, the grooves are decreased more strongly than the lands. This can be compensated by means of the following structuring bulbs.

The invention claimed is:

1. A method for shaping a hollow valve preform comprising:
   providing a valve preform, which comprises a head portion and a hollow shaft portion comprising a cavity, wherein the shaft portion has an initial outer diameter and an initial inner diameter,
   providing a pull rod having an enlarged structuring bulb at an insertion end of the pull rod that is smaller in outer diameter than the initial inner diameter of the hollow shaft portion of the valve preform,
   inserting the pull rod and structuring bulb into the cavity, wherein the structuring bulb has an outer structuring,
   shaping the hollow shaft portion, wherein at least a portion of an inner diameter of the shaft portion is reduced to be less than the outer diameter of the structuring bulb, and
   therefore pulling out the structuring bulb through the shaped shaft portion, wherein the outer structuring of the structuring bulb is at least partially pressed into the reduced inner diameter surface of the shaft portion to shape the inner diameter surface.

2. The method according to claim 1, wherein the structuring bulb has a coil-shaped outer structuring, and wherein the structuring bulb is rotated through the shaped shaft portion during the pull-out.

3. The method according to claim 1, further comprising repeating the steps of
   inserting,
   shaping, and
   pulling out
by use of the structuring bulbs, which each have a decreasing outer diameter.

4. The method according to claim 3, wherein the structuring bulbs each have a rising structure height.

5. The method according to claim 3, wherein the structuring bulbs have a coil-shaped outer structuring each with rising pitch.

6. The method according to claim 3, wherein structuring bulbs with right-handed and left-handed coil-shaped outer structuring are used alternately.

7. The method according to claim 3, further comprising aligning the structuring bulbs prior to the step of pulling out.

8. The method according to claim 3, further comprising aligning the structuring bulbs prior to the step of pulling out.

9. The method according to claim 1, wherein a pulling device control controls a pulling device so that the structuring bulb is pulled through the shaft portion with an oscillating force.

10. A valve blank or valve, produced by the method of claim 1.

11. The valve blank or valve according to claim 10, wherein a hollow shaft of the valve or valve blank is provided with grooves.

12. The valve or valve blank according to claim 10, wherein a hollow shaft of the valve or valve blank is provided with oppositely directed grooves.

* * * * *